US010410799B2

(12) United States Patent
Nagase et al.

(10) Patent No.: US 10,410,799 B2
(45) Date of Patent: Sep. 10, 2019

(54) ELECTROCHEMICAL DEVICE

(71) Applicant: TAIYO YUDEN CO., LTD., Taito-ku, Tokyo (JP)

(72) Inventors: Takatoshi Nagase, Takasaki (JP); Shinji Ishii, Takasaki (JP); Koji Kano, Takasaki (JP); Katsunori Yokoshima, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 197 days.

(21) Appl. No.: 15/462,739

(22) Filed: Mar. 17, 2017

(65) Prior Publication Data
US 2017/0278642 A1  Sep. 28, 2017

(30) Foreign Application Priority Data

Mar. 24, 2016  (JP) .................. 2016-060077

(51) Int. Cl.
H01M 10/04    (2006.01)
H01G 11/28    (2013.01)
H01G 11/52    (2013.01)
H01G 11/26    (2013.01)
H01G 11/66    (2013.01)
H01M 10/0587  (2010.01)
H01G 11/58    (2013.01)
H01G 11/68    (2013.01)

(52) U.S. Cl.
CPC .............. H01G 11/28 (2013.01); H01G 11/26 (2013.01); H01G 11/52 (2013.01); H01G 11/66 (2013.01); H01M 10/0431 (2013.01); H01M 10/0587 (2013.01); H01G 11/58 (2013.01); H01G 11/68 (2013.01); Y02E 60/13 (2013.01)

(58) Field of Classification Search
CPC ........ H01G 11/28; H01G 11/52; H01G 11/58; H01G 11/68; H01M 10/0431
See application file for complete search history.

(56) References Cited

U.S. PATENT DOCUMENTS

2012/0135285 A1* 5/2012 Iwama ................ H01M 2/26
                                                429/94
2015/0072201 A1  3/2015 Kubota et al.
2016/0126023 A1* 5/2016 Cao .................. H01G 11/06
                                                361/502

FOREIGN PATENT DOCUMENTS

| CN | 1954397 A     | 4/2007  |
| CN | 102479935 A   | 5/2012  |
| CN | 202246521 U   | 5/2012  |
| JP | 2002075802 A  | 3/2002  |
| JP | 2007109702 A  | 4/2007  |
| JP | 2012113995 A  | 6/2012  |
| JP | 2012226991 A  | 11/2012 |
| JP | 2014229860 A  | 12/2014 |
| WO | 2012066637 A1 | 5/2012  |

OTHER PUBLICATIONS

A Notification of Reasons for Refusal issued by the Japanese Patent Office, dated Mar. 27, 2018, for Japanese counterpart application No. 2016-060077.
A First Office Action issued by the State Intellectual Property Office of China dated Jun. 1, 2018 for Chinese counterpart application No. 201710183252.6.

* cited by examiner

Primary Examiner — Muhammad S Siddiquee
(74) Attorney, Agent, or Firm — Law Office of Katsuhiro Arai

(57) ABSTRACT

An electrochemical device includes a positive electrode, a negative electrode, and separators which are stacked and wound together, and electrolytic solution. A negative-electrode terminal is provided which is made of metal, and has a joining part which is a part joined to the principal face of the negative-electrode collector. The negative electrode has a first width, the positive electrode has a second width, which is smaller than the first width, and the separators have a third width, which is greater than the first width, along the direction parallel with the center axis of winding. The length of the joining part along the direction parallel with the center axis of winding is equal to or greater than the second width, but equal to or smaller than the third width.

4 Claims, 15 Drawing Sheets

|  | Width of negative-electrode terminal | Width of positive-electrode terminal | Width of separator | Length of negative-electrode terminal | Length of positive-electrode terminal | Amount of winding displacement |
|---|---|---|---|---|---|---|
|  | mm | mm | mm | mm | mm | — |
| Comparative Example 1 | 13 | 9 | 15 | 8 | 9 | 1.00 |
| Example 1 | 13 | 9 | 15 | 9 | 9 | 0.53 |
| Example 2 | 13 | 9 | 15 | 13 | 9 | 0.50 |
| Comparative Example 2 | 16 | 12 | 18 | 11 | 12 | 1.00 |
| Example 3 | 16 | 12 | 18 | 12 | 12 | 0.72 |
| Example 4 | 16 | 12 | 18 | 16 | 12 | 0.67 |

ELECTROCHEMICAL DEVICE

BACKGROUND

Field of the Invention

The present invention relates to an electrochemical device having an electric storage element constituted by a positive electrode, a negative electrode, and separators, being wound together.

Description of the Related Art

Lithium ion capacitors, electric double-layer capacitors, lithium ion secondary batteries, and other electrochemical devices are constituted in such a way that an electric storage element, constituted by a positive electrode and a negative electrode stacked together with a separator in between, is immersed in electrolytic solution. Wound-type electrochemical devices formed by winding together a positive electrode, a negative electrode, and separators, are also widely used.

Joined to the positive electrode and negative electrode, respectively, are electrode terminals used for electrical connection with the outside. For example, Patent Literature 1 describes an electric double-layer capacitor whose structure is such that a positive electrode and a negative electrode, each of which, having a flat electrode tab crimped to it, are wound together. Also, Patent Literature 2 describes an electric double-layer capacitor whose structure is such that the lead tab joined to the negative electrode is led out to the negative-electrode external terminal side and the opposite side of the negative-electrode terminal side.

BACKGROUND ART LITERATURES

[Patent Literature 1] Japanese Patent Laid-open No. 2014-229860

[Patent Literature 2] Japanese Patent Laid-open No. 2007-109702

SUMMARY

With lithium ion capacitors and other electrochemical devices, however, the width of the positive electrode is different from the width of the negative electrode in the direction parallel with the winding axis, in that the negative electrode is wider. This creates a problem where, if the length of the part joined to the positive electrode of the positive-electrode terminal is the same as that of the part joined to the negative electrode of the negative-electrode terminal, the electrodes will meander when the electric storage element is wound, thus preventing the wound element from maintaining structural uniformity.

In light of the aforementioned situation, an object of the present invention is to provide an electrochemical device that improves the structural non-uniformity arising from the positive electrode and negative electrode having different widths.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electrochemical device pertaining to an embodiment of the present invention has a positive electrode, a negative electrode, a positive-electrode terminal, a negative-electrode terminal, separators, and electrolytic solution.

The negative electrode has a negative-electrode collector being a metal foil, and a negative-electrode active material layer formed on the principal face of the negative-electrode collector.

The positive electrode has a positive-electrode collector being a metal foil, and a positive-electrode active material layer formed on the principal face of the positive-electrode collector.

The negative-electrode terminal is made of metal, and has a joining part which is a part joined to the principal face of the negative-electrode collector.

The separators insulate the positive electrode and negative electrode.

The electrolytic solution immerses the positive electrode, negative electrode, and separators.

The positive electrode, negative electrode, and separators are stacked and wound together, with the separators separating the positive electrode and negative electrode.

The negative electrode has a first width along the direction parallel with the center axis of winding.

The positive electrode has a second width, which is smaller than the first width, along the direction parallel with the center axis of winding.

The separators have a third width, which is greater than the first width, along the direction parallel with the center axis of winding.

The length of the joining part along the direction parallel with the center axis of winding is equal to or greater than the second width, but equal to or smaller than the third width.

In the constitution where the positive electrode and negative electrode are stacked and wound together with the separator in between, the positive-electrode active material and negative-electrode active material face each other via the separator over large parts of the positive electrode and negative electrode, but in other parts the positive-electrode active material and negative-electrode terminal face each other via the separator. If the length of the joining part of the negative-electrode terminal, or specifically the part joined to the principal face of the negative-electrode collector, is smaller than the width of the positive electrode, then a region is formed where a part of the positive-electrode active material faces the negative-electrode terminal in the width direction of the positive electrode and the other part faces the negative-electrode active material. In this region, the distance between the positive electrode and negative electrode varies in the width direction and a structural non-uniformity occurs. If the length of the joining part is greater than the width of the positive electrode, on the other hand, a region where a part of the positive-electrode active material faces the negative-electrode terminal in the width direction of the positive electrode and the other part faces the negative-electrode active material is not formed. As a result, the distance between the positive electrode and negative electrode does not vary in the width direction and a structural non-uniformity does not occur.

Lithium ions may be pre-doped into the negative-electrode active material layer.

The electrochemical device pertaining to the present invention may be a lithium ion capacitor whose negative-electrode active material layer is pre-doped with lithium ions. Lithium ion capacitors generally have a structure where the width of the negative electrode is greater than the width of the positive electrode; however, the structural non-uniformity arising from the positive electrode and negative electrode having different widths can be improved by the aforementioned constitution.

The negative electrode may have a negative-electrode non-forming region where the negative-electrode active material layer is not formed on the principal face, the joining part may be joined to the negative-electrode collector in the negative-electrode non-forming region, and the negative-electrode non-forming region may have the first width along the direction parallel with the center axis of winding.

As described above, an electrochemical device that improves the structural non-uniformity arising from the positive electrode and negative electrode having different widths, can be provided according to the present invention.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

100—Electrochemical device
110—Electric storage element
130—Negative electrode
130a—Negative-electrode non-forming region
131—Negative-electrode terminal
131b—Joining part
140—Positive electrode
140a—Positive-electrode non-forming region
141—Positive-electrode terminal
150—Separator

DETAILED DESCRIPTION OF EMBODIMENTS

The electrochemical device 100 pertaining to this embodiment is explained. The electrochemical device 100 may be a lithium ion capacitor. The electrochemical device 100 may also be an electric double-layer capacitor, lithium ion secondary battery, or other type of electrochemical device that can be charged and discharged.

[Constitution of Electrochemical Device]

Figure 1:
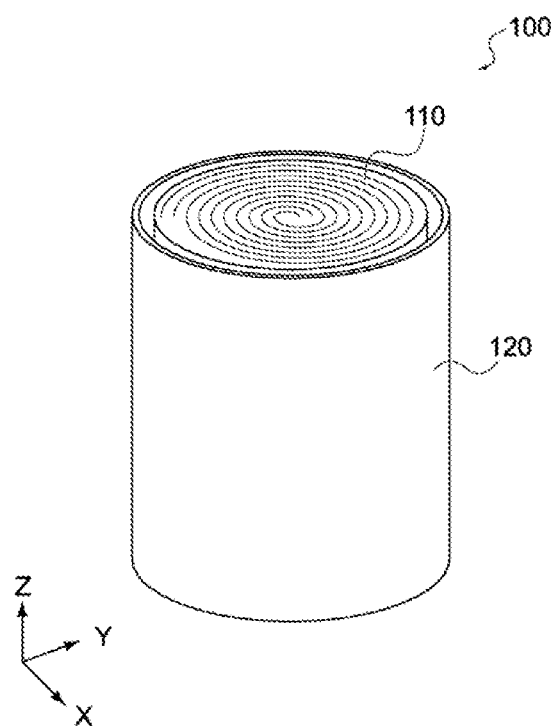
FIG. 1 is a perspective view of an electrochemical device pertaining to an embodiment of the present invention.

FIG. 1 is a perspective view showing the constitution of the electrochemical device 100 pertaining to this embodiment. As shown in the figure, the electrochemical device 100 is constituted by an electric storage element 110 and a container 120 (its lid and terminals are not illustrated) housing it. Electrolytic solution is housed in the container 120, together with the electric storage element 110.

Figure 2:
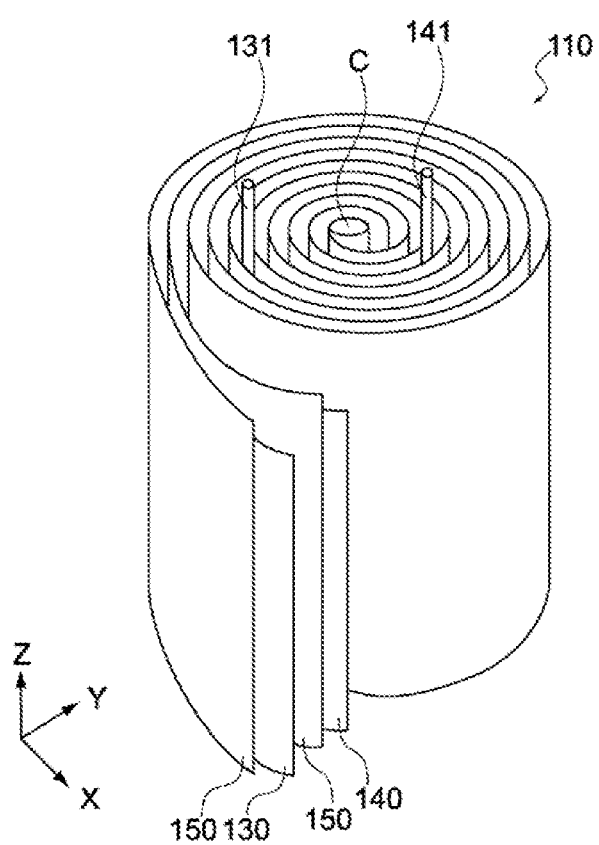
FIG. 2 is a perspective view of the electric storage element the electrochemical device has.
Figure 3:
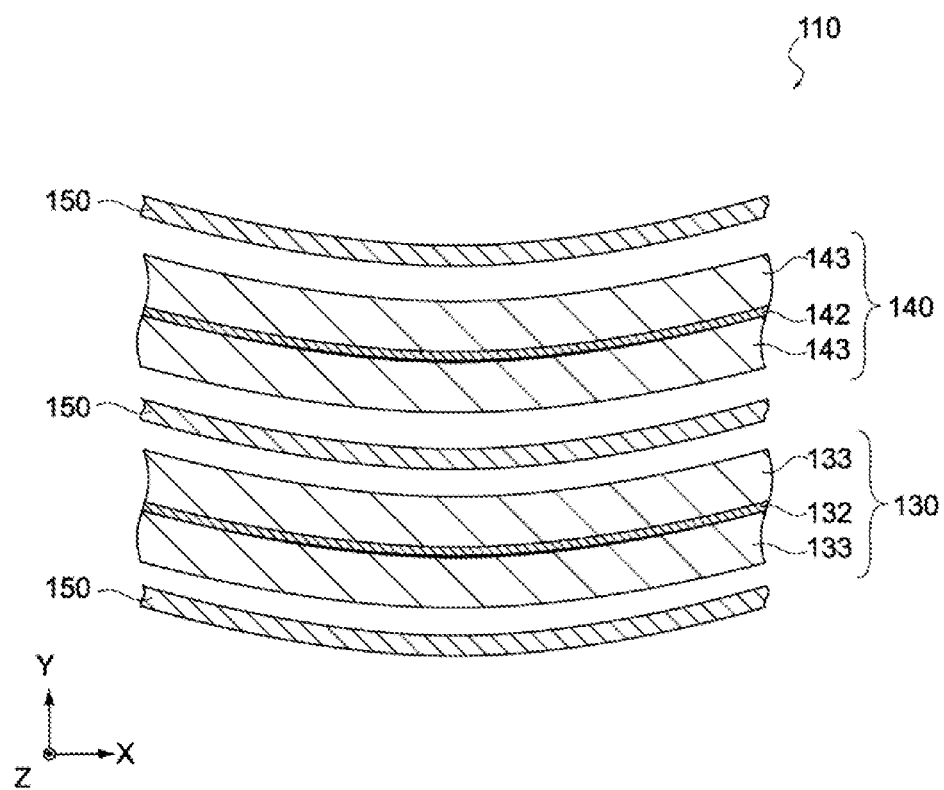
FIG. 3 is a cross sectional view of the electric storage element.

FIG. 2 is a perspective view of the electric storage element 110, while FIG. 3 is an enlarged cross sectional view of the electric storage element 110. As shown in FIGS. 2 and 3, the electric storage element 110 has a negative electrode 130, a positive electrode 140, and separators 150, and is constituted in such a way that a laminate, consisting of the foregoing stacked on top of each other, is wound around a winding core C. The direction in which the winding core C extends, or specifically the direction parallel with the center axis of winding, is hereinafter referred to as the "Z direction." The X direction represents the direction perpendicular to the Z direction, while the Y direction represents the direction perpendicular to the X direction and Z direction. It should be noted, also, that the winding core C need not be provided.

The negative electrode 130, positive electrode 140, and separators 150 constituting the electric storage element 110 are stacked in the order of separator 150, negative electrode 130, separator 150, and positive electrode 140, toward the winding core C (from the outer side of winding), as shown in FIG. 2. Also, the electric storage element 110 has a negative-electrode terminal 131 and a positive-electrode terminal 141, as shown in FIG. 2. The negative-electrode terminal 131 is connected to the negative electrode 130, while the positive-electrode terminal 141 is connected to the positive electrode 140, and both are led out to the exterior of the electric storage element 110, as shown in FIG. 2.

The negative electrode 130 has a negative-electrode collector 132 and negative-electrode active material layers 133, as shown in FIG. 3. The negative-electrode collector 132 is made of conductive material, and may be a copper foil or other metal foil. The negative-electrode collector 132 may be a metal foil whose surface is roughened by a chemical or mechanical means, or a metal foil in which through holes have been formed. The thickness of the negative-electrode collector 132 may be 20 μm, for example.

The negative-electrode active material layers 133 are formed on the negative-electrode collector 132. The material for the negative-electrode active material layers 133 may be a mixture of a negative-electrode active material and a binder resin, which may further contain a conductive aid. For the negative-electrode active material, any material capable of adsorbing lithium ions in the electrolytic solution may be used, such as non-graphitizable carbon (hard carbon), graphite, soft carbon, or other carbon material.

For the binder resin, any synthetic resin that joins the negative-electrode active material may be used, such as carboxy methyl cellulose, styrene butadiene rubber, polyethylene, polypropylene, polyethylene terephthalate, aromatic polyamide, carboxy methyl cellulose, fluororubber, polyvinylidene fluoride, isoprene rubber, butadiene rubber, and ethylene propylene rubber, for example.

The conductive aid is constituted by grains made of conductive material, and improves the conductivity between negative-electrode active materials. The conductive aid may be acetylene black, graphite, carbon black, or other carbon material, for example. Any of these may be used alone or multiple types may be mixed. It should be noted that the conductive aid may be a material having conductivity, such as metal material and conductive polymer, among others.

The negative-electrode active material layer 133 may be provided directly on the negative-electrode collector 132, or it may be provided on an undercoat layer provided on the negative-electrode collector 132. The thickness of the negative-electrode active material layer 133 may be 70 μm, for example, and the thickness of the undercoat layer may be 5 μm, for example.

Figure 4A:
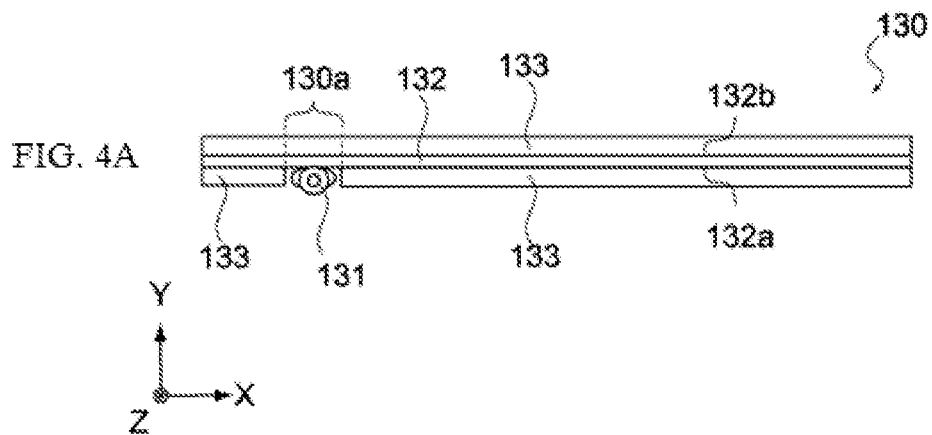
FIGS. 4A and 4B are plan views of the negative electrode of the electric storage element.
Figure 4B:
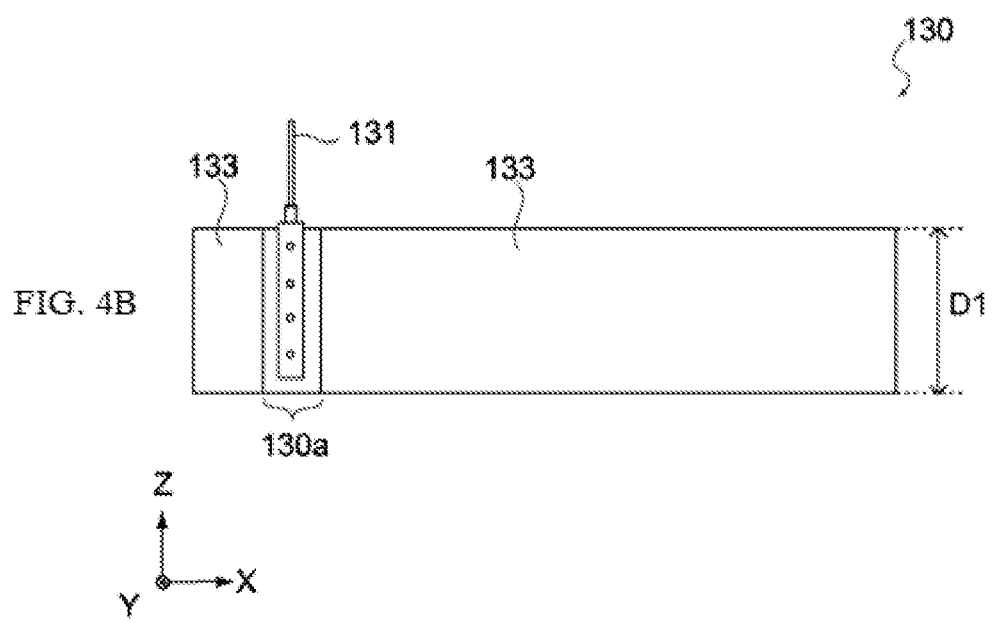

FIGS. 4A and 4B provide schematic views showing the negative electrode 130 before winding, where FIG. 4A is a view from the Z direction, while FIG. 4B is a view from the Y direction. As shown in FIG. 4A, the negative-electrode active material layer 133 is formed on both the first principal face 132*a* and second principal face 132*b* of the negative-electrode collector 132 of the negative electrode 130.

As shown in these figures, the negative electrode 130 has a rectangular shape. The width of the short side of the negative electrode 130 is defined as the first width D1. The first width D1 represents the width along the direction (Z direction) parallel with the center axis of winding when the negative electrode 130 is wound with the positive electrode 140 and separators 150.

As shown in FIGS. 4A and 4B, the negative electrode 130 has a negative-electrode non-forming region 130*a*, and the negative-electrode terminal 131 is joined in the negative-electrode non-forming region 130*a*. The negative-electrode non-forming region 130*a* is a region where the negative-electrode active material layer 133 is not provided, but the negative-electrode collector 132 is exposed instead, on the first principal face 132*a*. In the negative-electrode non-forming region 130*a*, the width along the direction (Z direction) parallel with the center axis of winding corresponds to the first width D1; in other words, this region is formed from one end to the other end of the negative electrode 130 in the Z direction.

Figure 5:
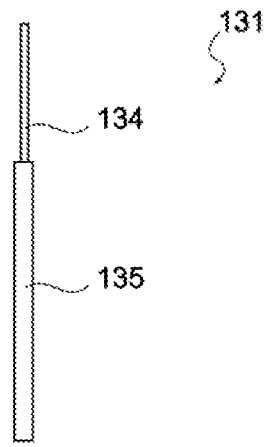
FIG. 5 is a plan view of the negative-electrode terminal not yet joined to the negative electrode of the electric storage element.

The negative-electrode terminal 131 is joined to the negative-electrode collector 132 exposed in the negative-electrode non-forming region 130*a*, and is electrically connected to the negative-electrode collector 132. FIG. 5 is a plan view showing the negative-electrode terminal 131 not yet joined. As shown in this figure, the negative-electrode terminal 131 has a linear member 134 and a tubular member 135. The linear member 134 is a line-shaped metal member, while the tubular member 135 is a tube-shaped metal member. The negative-electrode terminal 131 is constituted by the linear member 134 inserted through the tubular member 135.

Figure 6:
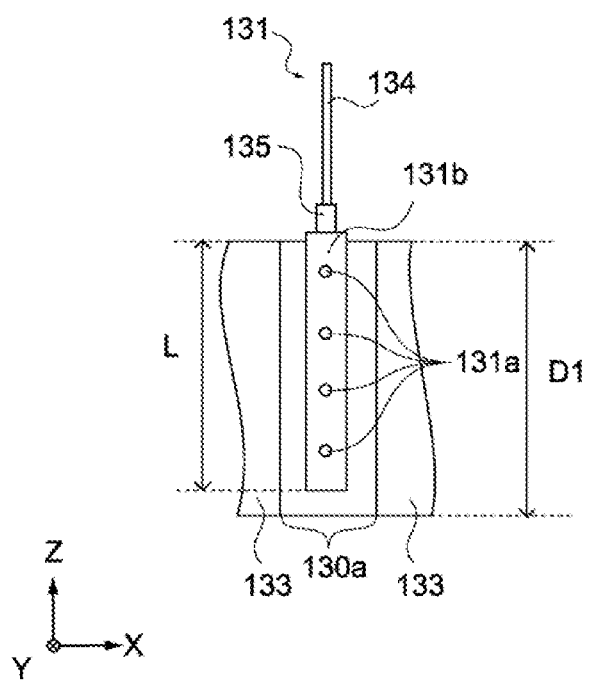
FIG. 6 is a plan view of the negative-electrode terminal joined to the negative electrode of the electric storage element.

The negative-electrode terminal 131 may be joined to the negative-electrode collector 132 by means of needle crimping. FIG. 6 is a plan view of the negative-electrode terminal 131 joined to the negative-electrode collector 132, while FIG. 7 is a cross sectional view of the negative-electrode terminal 131 joined to the negative-electrode collector 132.

As shown in these figures, the negative-electrode terminal 131 may be joined to the negative-electrode collector 132 by holding the tubular member 135 in contact with the negative-electrode collector 132 and then pressing the two together while simultaneously crimping them using a needle 131*a*. This results in the tubular member 135 being crushed and becoming flat, except for some areas. The needle 131*a*, as shown in FIG. 7, pierces through the tubular member 135, negative-electrode collector 132, and negative-electrode active material layer 133, and fixes them together. It should be noted that the negative-electrode collector 132 of the negative-electrode terminal 131 need not be joined by means of needle crimping; instead, the joining may be done by means of bonding using conductive adhesive, welding, or the like.

Figure 7:
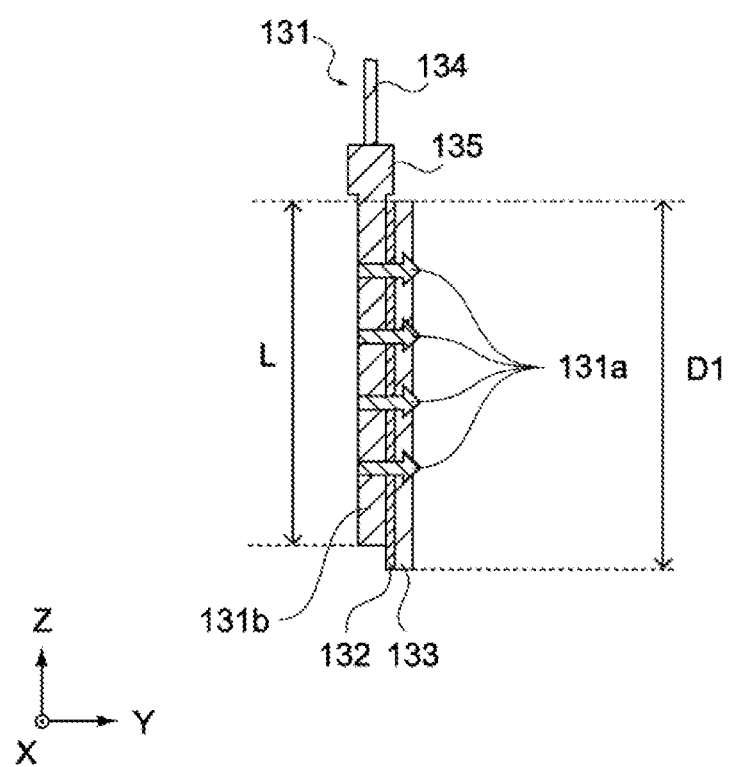
FIG. 7 is a cross sectional view of the negative-electrode terminal joined to the negative electrode of the electric storage element.

As shown in FIGS. 6 and 7, the part of the negative-electrode terminal 131 being joined to the negative-electrode collector 132 is defined as a joining part 131*b*. Also, the length of the joining part 131*b* along the Z direction is defined as the length L.

Figure 8A:
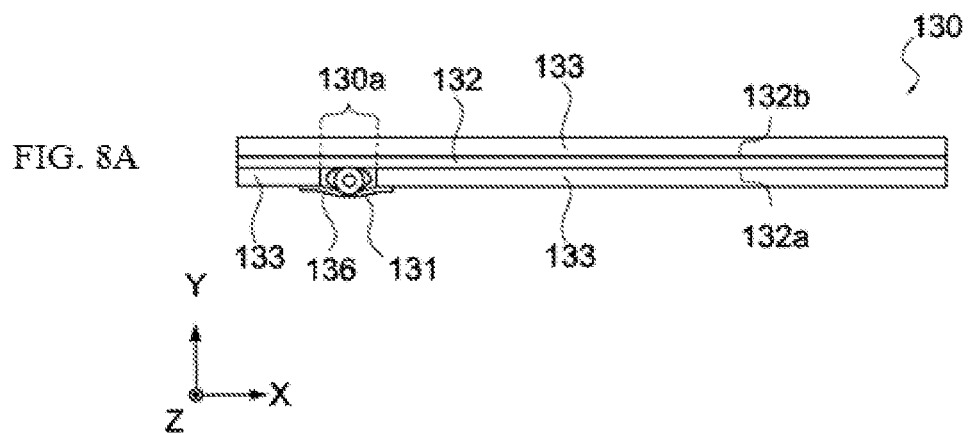
FIGS. 8A and 8B are plan views of the negative electrode of the electric storage element.
Figure 8B:
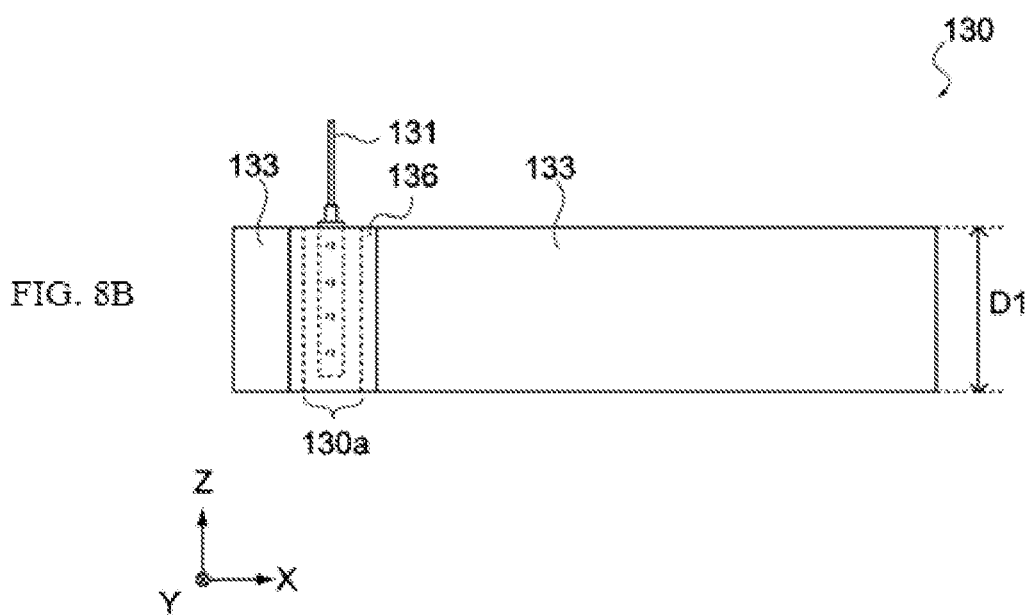

The negative-electrode terminal 131 is covered with a protective tape 136. FIGS. 8A and 8B provide schematic views showing the negative electrode 130 with the protective tape 136 on it, where FIG. 8A is a view from the Z direction, while FIG. 8B is a view from the Y direction. The protective tape 136 is a tape made of insulating material, and preferably resistant to heat and the solvent of the electrolytic solution. The protective tape 136, as shown in these figures, is attached to the negative-electrode active material layer 133 via the negative-electrode non-forming region 130*a*, and covers the joining part 131*b* and the negative-electrode non-forming region 130*a*.

The positive electrode 140, as shown in FIG. 3, has a positive-electrode collector 142 and a positive-electrode active material layer 143. The positive-electrode collector 142 is made of conductive material, and may be a metal foil such as aluminum foil or copper foil. The positive-electrode collector 142 may be a metal foil whose surface is chemically or mechanically roughened, or a metal foil in which through holes are formed. The thickness of the positive-electrode collector 142 may be 20 μm, for example.

The positive-electrode active material layers 143 are formed on the positive-electrode collector 142. The material for the positive-electrode active material layers 143 may be a mixture of a positive-electrode active material and a binder resin, which may further contain a conductive aid. For the positive-electrode active material, any material capable of adsorbing lithium ions and anions in the electrolytic solution may be used, such as active carbon or polyacene carbide, for example.

For the binder resin, any synthetic resin that joins the positive-electrode active material may be used, such as carboxy methyl cellulose, styrene butadiene rubber, polyethylene, polypropylene, polyethylene terephthalate, aromatic polyamide, carboxy methyl cellulose, fluororubber, polyvinylidene fluoride, isoprene rubber, butadiene rubber, and ethylene propylene rubber, for example.

The conductive aid is constituted by grains made of conductive material, and improves the conductivity between positive-electrode active materials. The conductive aid may be acetylene black, graphite, carbon black, or other carbon material, for example. Any of these may be used alone or multiple types may be mixed. It should be noted that the conductive aid may be a material having conductivity, such as metal material and conductive polymer, among others.

The positive-electrode active material layer 143 may be provided directly on the positive-electrode collector 142, or it may be provided on an undercoat layer provided on the positive-electrode collector 142. The thickness of the positive-electrode active material layer 143 may be 70 μm, for example, and the thickness of the undercoat layer may be 5 μm, for example.

Figure 9A:
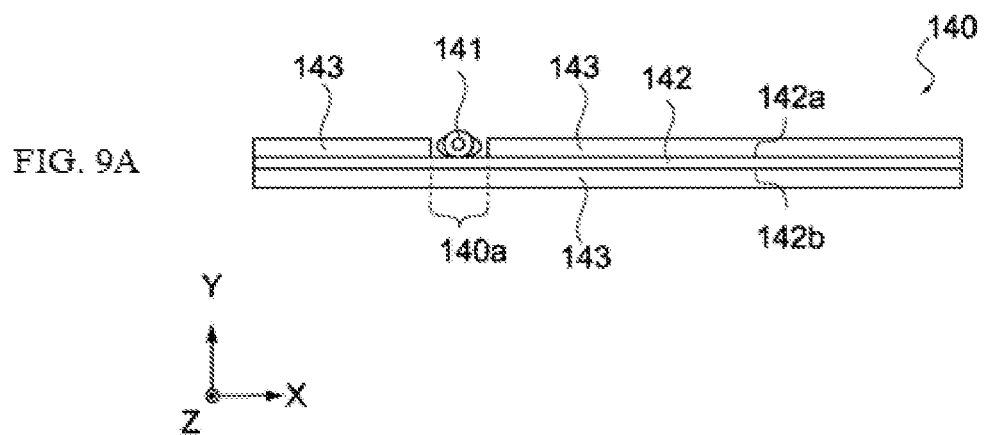
FIGS. 9A and 9B are plan views of the positive electrode of the electric storage element.
Figure 9B:
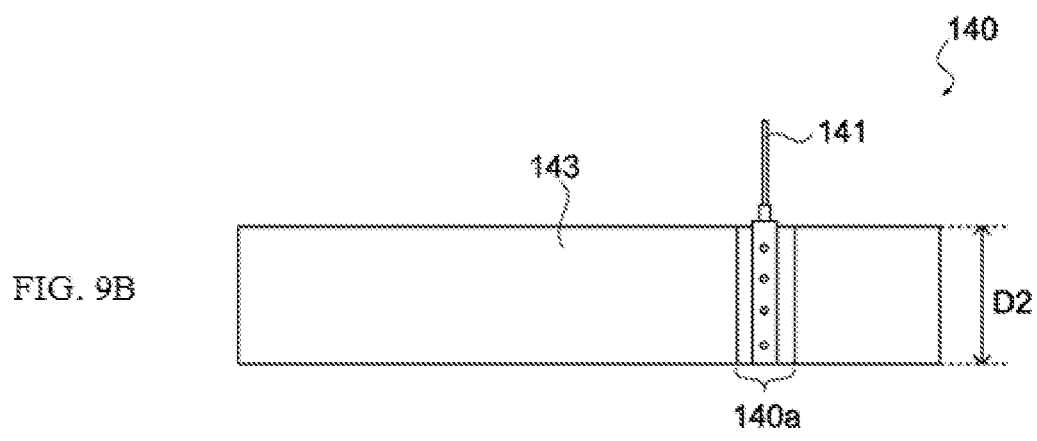

FIGS. 9A and 9B provide schematic views showing the positive electrode 140 before winding, where FIG. 9A is a view from the Z direction, while FIG. 9B is a view from the Y direction. As shown in FIG. 9A, the positive-electrode active material layer 143 is formed on both the first principal face 142a and second principal face 142b of the positive-electrode collector 142 of the positive electrode 140.

As shown in these figures, the positive electrode 140 has a rectangular shape. The width of the short side of the positive electrode 140 is defined as the second width D2. The second width D2 represents the width along the direction (Z direction) parallel with the center axis of winding when the positive electrode 140 is wound with the negative electrode 130 and separators 150.

As shown in FIGS. 9A and 9B, the positive electrode 140 has a positive-electrode non-forming region 140a, and the positive-electrode terminal 141 is joined in the positive-electrode non-forming region 140a. The positive-electrode non-forming region 140a is a region where the positive-electrode active material layer 143 is not provided, but the positive-electrode collector 142 is exposed instead, on the first principal face 142a. In the positive-electrode non-forming region 140a, the width along the direction (Z direction) parallel with the center axis of winding corresponds to the second width D2; in other words, this region is formed from one end to the other end of the positive electrode 140 in the Z direction.

The positive-electrode terminal 141 is joined to the positive-electrode collector 142 exposed in the positive-electrode non-forming region 140a, and is electrically connected to the positive-electrode collector 142. Just like the negative-electrode terminal 131, the positive-electrode terminal 141 may be constituted by a linear member inserted through a tubular member, and it may be joined to the positive-electrode collector 142 by means of needle crimping using a needle 141c.

Figure 10A:
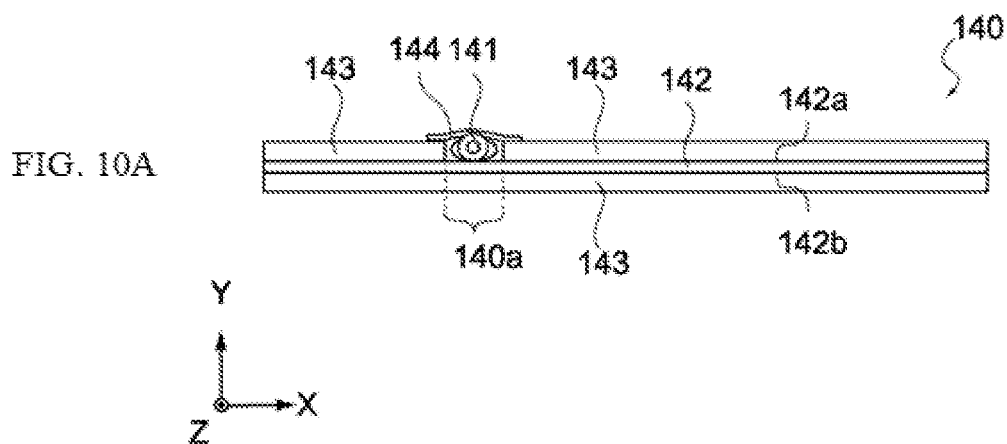
FIGS. 10A and 10B are plan views of the positive electrode of the electric storage element.
Figure 10B:
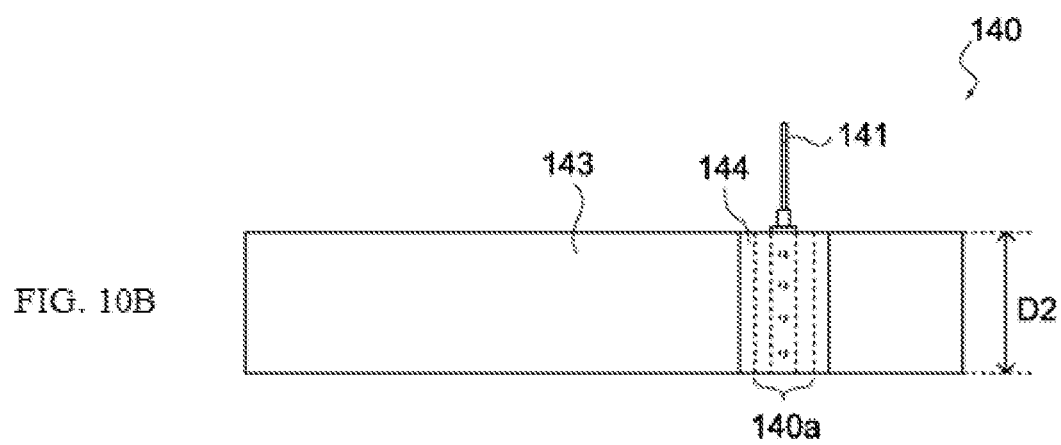

The positive-electrode terminal 141 is covered with a protective tape 144. FIGS. 10A and 10B provide schematic views showing the positive electrode 140 with the protective tape 144 on it, where FIG. 10A is a view from the Z direction, while FIG. 10B is a view from the Y direction. The protective tape 144 is a tape made of insulating material, and preferably resistant to heat and the solvent of the electrolytic solution. The protective tape 144, as shown in these figures, is attached to the positive-electrode active material layer 143 via the positive-electrode non-forming region 140a, and covers the positive-electrode terminal 141 and the positive-electrode non-forming region 140a.

The separator 150 separates and insulates the negative electrode 130 and positive electrode 140, while letting the ions contained in the electrolytic solution described later pass through it. To be specific, the separator 150 may be woven fabric, nonwoven fabric, or microporous membrane of synthetic resin, or the like. The width of the separator 150 along the Z direction is defined as the third width D3 (refer to FIG. 13). The third width D3 is greater than the first width D1 being the width of the negative electrode 130.

Figure 11:
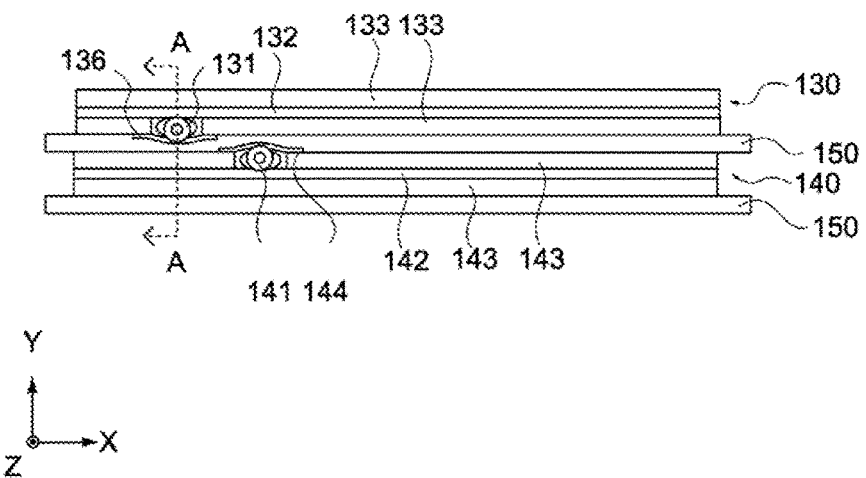
FIG. 11 is a plan view showing the positive electrode, negative electrode, and separators of the electric storage element before winding.

The negative electrode 130 and positive electrode 140 are stacked and wound together with the separator 150 in between. FIG. 11 is a schematic view of a laminate constituted by the negative electrode 130, positive electrode 140, and separators 150, stacked together. As shown in this figure, they are stacked in the order of separator 150, positive electrode 140, separator 150, and negative electrode 130.

Figure 12:
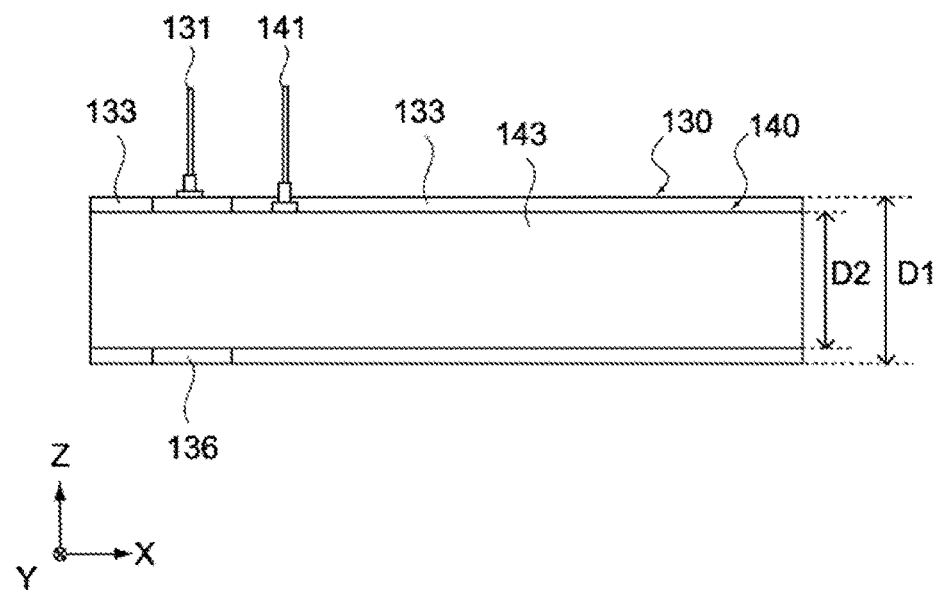
FIG. 12 is a plan view showing the positive electrode and negative electrode of the electric storage element before winding.

FIG. 12 is a schematic view of the negative electrode 130 and positive electrode 140 stacked together, not showing the separators 150. As shown in this figure, the second width D2 is smaller than the first width D1.

Figure 13:
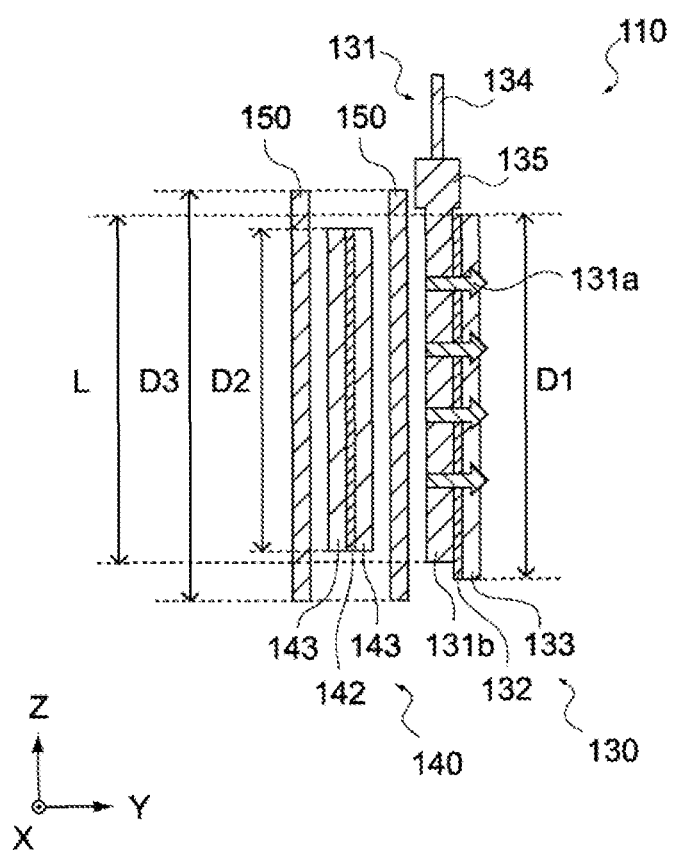
FIG. 13 is a cross sectional view of the electric storage element.

FIG. 13 is a cross sectional view of the laminate constituted by the negative electrode 130, positive electrode 140, and separators 150, stacked together, corresponding to a cross sectional view of FIG. 11 along line A-A. As shown in this figure, the length L of the joining part 131b is equal to or greater than the second width D2 being the width of the positive electrode 140, but equal to or smaller than the third width D3 being the width of the separator 150.

The electric storage element 110 may be produced by winding, around a winding core C, the laminate constituted by the negative electrode 130, positive electrode 140, and separators 150, stacked together as described above.

The container 120 houses the electric storage element 110. The top face and bottom face of the container 120 may be closed by lids (not illustrated). The material of the container 120 is not limited in any way, and may be a metal whose primary component is aluminum, titanium, nickel, or iron, or may be stainless steel, for example.

The electrochemical device 100 is constituted as described above. The electrolytic solution housed in the container 120 together with the electric storage element 110 is a liquid containing lithium ions and anions; for example, it may be a liquid prepared by dissolving an electrolyte, such as $LiBF_4$ or $LiPF_6$, in a solvent (carbonate ester, etc.).

Lithium ions are pre-doped into the negative electrode 130 of the electrochemical device 100. Lithium ion pre-doping is performed by electrically connecting a lithium ion source containing metal lithium to the negative electrode 130 and immersing the electric storage element 110 in the electrolytic solution. Lithium ions released from the lithium ion source are doped into the negative-electrode active material layer 133 via the electrolytic solution.

[Effects of Electrochemical Device]

As mentioned above, the length L of the joining part 131b is equal to or greater than the second width D2 being the width of the positive electrode 140, but equal to or smaller than the third width D3 being the width of the separator 150. This effect is explained by comparison against a comparative example.

Figure 14:
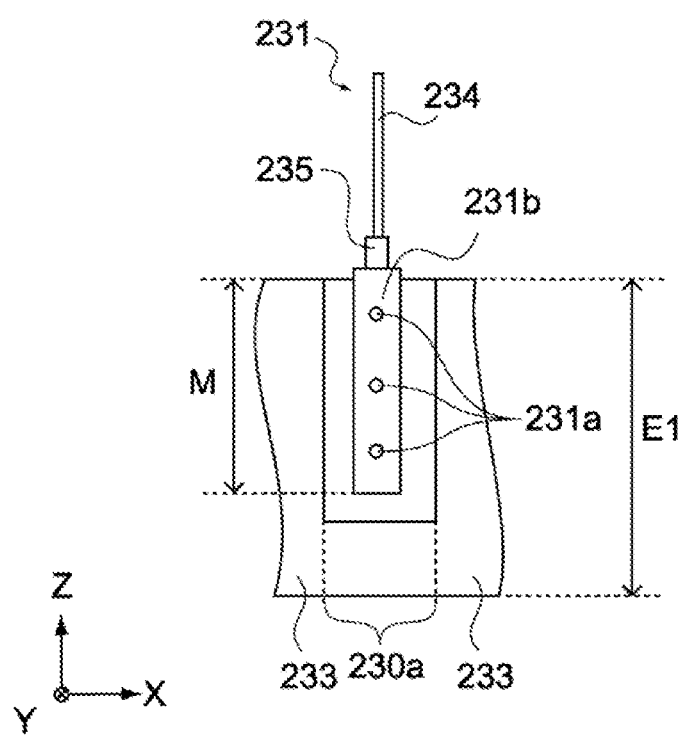
FIG. 14 is a plan view showing the negative-electrode terminal of the electric storage element of the electrochemical device pertaining to a comparative example of the present invention.
Figure 15:
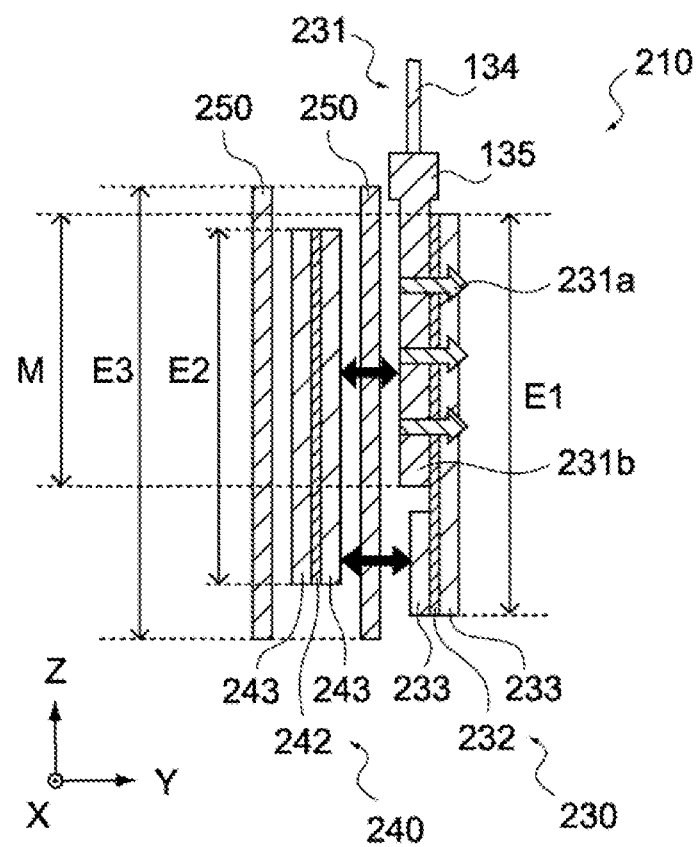
FIG. 15 is a cross sectional view of the electric storage element.

FIG. 14 is a schematic view of the negative electrode of the electric storage element 210 pertaining to the comparative example, while FIG. 15 is a cross sectional view of the electric storage element 210. As shown in FIG. 15, the electric storage element 210 has a negative electrode 230, a positive electrode 240, and separators 250. The negative electrode 230 has a negative-electrode terminal 231, a negative-electrode collector 232, and a negative-electrode active material layer 233. The negative-electrode terminal 231 is joined to the negative-electrode collector 232 using a needle 231a. The positive electrode 240 has a positive-electrode terminal (not illustrated), a positive-electrode collector 242, and a positive-electrode active material layer 243.

As shown in this figure, the width E1 of the negative electrode 230 is greater than the width E2 of the positive electrode 240, while the width E3 of the separator 250 is greater than the width E1 of the negative electrode 230. Also, the length M of the joining part 231b of the negative-electrode terminal 231 is smaller than the second width E2. In this case, the distance between the positive-electrode active material layer 243 and the negative-electrode terminal 231 varies from the distance between the positive-electrode active material layer 243 and the negative-electrode active material layer 233, as shown by the arrows in the figure. As a result, the negative electrode 230, positive electrode 240, and separators 250 meander as they are wound, causing the structure of the electric storage element 210 to become non-uniform.

With the electric storage element 110 pertaining to this embodiment, on the other hand, the length L of the joining part 231b is equal to or greater than the second width D2, as mentioned above, which means that the distance between the negative electrode 130 and the positive electrode 140 does not vary due to the negative-electrode terminal 131, which in turn allows the structure of the electric storage element 110 to become uniform.

[Variation Example]

Figure 16:
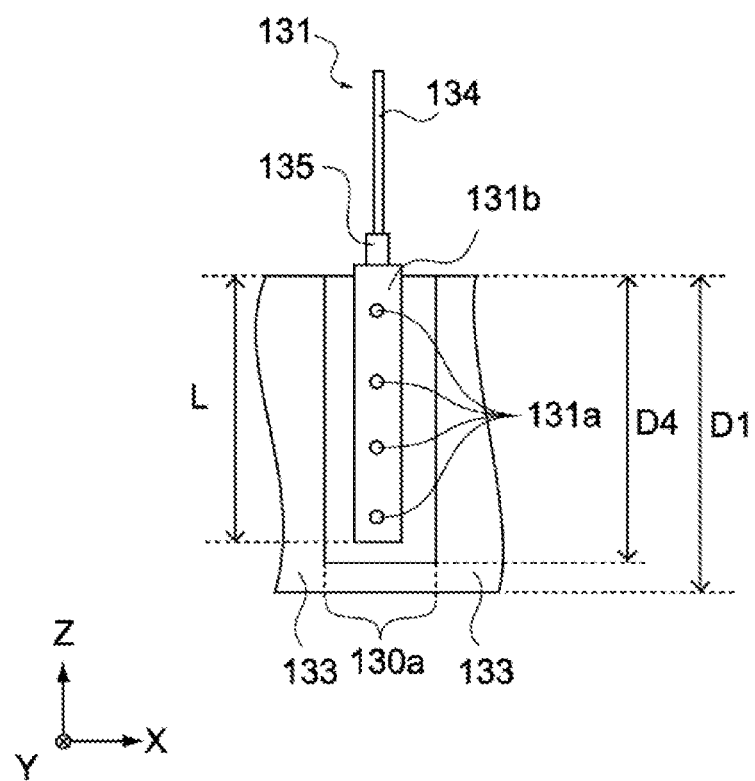
FIG. 16 is a plan view showing the negative-electrode terminal of the electric storage element of the electrochemical device pertaining to a variation example of the present invention.
Figures 17, 18:
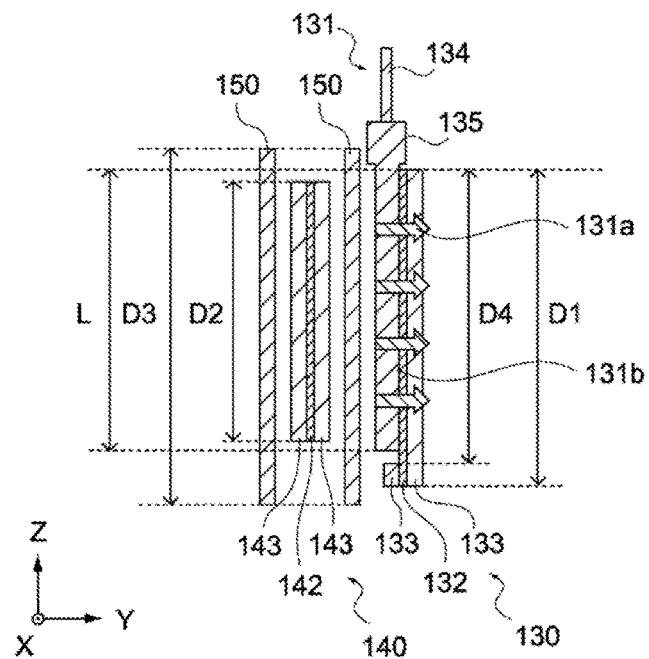
FIG. 17 is a cross sectional view of the electric storage element.
FIG. 18 is a table showing the constitutions and measured results of the electrochemical devices pertaining to examples and comparative examples of the present invention.

In the aforementioned embodiment, the negative-electrode non-forming region 130a has the first width D1 along the Z direction; however, it may have a width smaller than the first width D1. FIGS. 16 and 17 are schematic views showing the negative-electrode non-forming region 130a pertaining to a variation example. As shown in these figures, the fourth width D4, defined as the width of the negative-electrode non-forming region 130a along the Z direction, may be a width smaller than the first width D1 but greater than the second width D2. Even with this structure, the distance between the negative electrode 130 and the positive electrode 140 does not vary due to the negative-electrode terminal 131, which allows the structure of the electric storage element 110 to become uniform.

EXAMPLES

Electric storage elements were produced and their structures were evaluated. To be specific, a slurry was produced by mixing active carbon as an active material, acetylene black as a conductive aid, and carboxyl methyl cellulose and styrene butadiene rubber as binders.

This slurry was applied on a negative-electrode collector made of an aluminum foil of 20 µm in thickness, to form a negative electrode layer on the negative-electrode collector. The negative-electrode layer is a layer constituted by a 5-µm thick undercoat layer and a 70-µm thick negative-electrode active material layer. On the negative-electrode collector, a negative-electrode non-forming region was formed where the negative-electrode active material layer was not formed but the negative-electrode collector was exposed instead, and a negative-electrode terminal was joined in this region by means of needle crimping. A sheet-shaped negative electrode was thus produced.

Also, the aforementioned slurry was applied on a positive-electrode collector made of an aluminum foil of 20 µm in thickness, to form a positive electrode layer on the positive-electrode collector. The positive-electrode layer is a layer constituted by a 5-µm thick undercoat layer and a 70-µm thick positive-electrode active material layer. On the positive-electrode collector, a positive-electrode non-forming region was formed where the positive-electrode active material layer was not formed but the positive-electrode collector was exposed instead, and a positive-electrode terminal was joined in this region by means of needle crimping. A sheet-shaped positive electrode was thus produced.

The belt-shaped positive electrode (290 mm long) and negative electrode (290 mm long) were put one atop the other with the separator (320 mm long) in between, and they were wound around a winding core of 3 mm in diameter. For the separator, a 35-µm thick cellulose separator was used. The wound element was secured with polyimide tape, to produce a wound-type electric storage element.

FIG. 18 is a table showing the sizes of the respective parts of the electric storage elements pertaining to examples and comparative examples. As shown in this table, the electric storage elements pertaining to Examples 1 to 4 had a negative-electrode terminal whose length was equivalent to or greater than the width of the positive electrode, but equal to or smaller than the width of the separator. With the electric storage elements pertaining to Comparative Examples 1 and 2, on the other hand, the length of the negative-electrode terminal was smaller than the width of the positive electrode. It should be noted that the widths and lengths shown in this table represent widths and lengths along the direction parallel with the center axis of winding of the electric storage element.

The electric storage elements pertaining to the examples and comparative examples were evaluated for the amount of winding displacement of the positive electrode and negative electrode at the end of winding. The amount of winding displacement corresponds to the length between the positive electrode and negative electrode at the end face on one side, measured in the direction parallel with the center axis of winding of the electric storage element. FIG. 18 shows the amounts of winding displacement. It should be noted that, for Examples 1 and 2, the amount of winding displacement is shown as a ratio relative to the amount of winding displacement in Comparative Example 1 when being set to 1, while, for Examples 3 and 4, the amount of winding displacement is shown as a ratio relative to the amount of winding displacement in Comparative Example 2 when being set to 1.

As shown in this table, Examples 1 to 4 had smaller amounts of winding displacement compared to those in Comparative Examples 1 and 2, suggesting improved structural non-uniformities of the electric storage elements.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-060077, filed Mar. 24, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electrochemical device comprising:
a negative electrode having a negative-electrode collector being a metal foil, and a negative-electrode active material layer formed on a principal face of the negative-electrode collector;
a positive electrode having a positive-electrode collector being a metal foil, and a positive-electrode active material layer formed on a principal face of the positive-electrode collector;
a negative-electrode terminal made of metal, and having a joining part which is a part joined to the principal face of the negative-electrode collector;
separators that insulate the positive electrode and negative electrode; and
electrolytic solution that immerses the positive electrode, negative electrode, and separators, and
the positive electrode, negative electrode, and separators being stacked and wound together, with the separators separating the positive electrode and negative electrode;
wherein,
the negative electrode has a first width along a direction parallel with a center axis of winding;
the positive electrode has a second width, which is smaller than the first width, along the direction parallel with the center axis of winding;
the separators have a third width, which is greater than the first width, along the direction parallel with the center axis of winding; and
a length of the joining part along the direction parallel with the center axis of winding is equal to or greater than the second width, but equal to or smaller than the third width,
wherein the negative electrode has a negative-electrode non-forming region where the negative-electrode active material layer is not formed on the principal face;
the joining part is joined to the negative-electrode collector in the negative-electrode non-forming region;
the negative-electrode non-forming region has the first width along the direction parallel with the center axis of winding; and
the negative-electrode non-forming region and the joining part of the negative-electrode terminal are covered with an insulating protective tape in a manner covering an entire width, along the direction parallel with the center axis of winding, and an entire length, along a direction perpendicular to the center axis of winding, of the negative-electrode non-forming region on a side of the negative-electrode terminal opposite to a side on which the negative-electrode terminal contacts the negative-electrode collector and in a manner attaching to and bridging portions of the negative-electrode active material layer contouring the negative-electrode non-forming region.

2. An electrochemical device according to claim 1, wherein lithium ions are pre-doped into the negative-electrode active material layer.

3. An electrochemical device according to claim 1, further comprising:
a positive-electrode terminal made of metal, and having a joining part which is a part joined to the principal face of the positive-electrode collector.

4. An electrochemical device according to claim 3, wherein the positive electrode has a positive-electrode non-forming region where the positive-electrode active material layer is not formed on the principal face; and
the joining part is joined to the positive-electrode collector in the positive-electrode non-forming region.

* * * * *